United States Patent
Biehl

(10) Patent No.: US 7,681,655 B2
(45) Date of Patent: Mar. 23, 2010

(54) FRYER FIRE SUPPRESSION SYSTEM

(75) Inventor: Richard J. Biehl, Marinette, WI (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 11/961,536

(22) Filed: Dec. 20, 2007

(65) Prior Publication Data
US 2008/0149354 A1    Jun. 26, 2008

Related U.S. Application Data

(60) Provisional application No. 60/876,690, filed on Dec. 22, 2006.

(51) Int. Cl.
- *A62C 3/00* (2006.01)
- *A62C 31/02* (2006.01)
- *A62C 31/05* (2006.01)
- *A47J 27/09* (2006.01)
- *A47J 37/12* (2006.01)
- *A47J 27/08* (2006.01)

(52) U.S. Cl. .............. 169/65; 169/70; 99/337; 99/403

(58) Field of Classification Search .......... 169/48, 169/49, 54, 65, 66, 70; 99/331, 337, 403; 126/373.1, 374.1

See application file for complete search history.

(56) References Cited

U.S. PATENT DOCUMENTS

| | | | |
|---|---|---|---|
| 3,584,688 A | * | 6/1971 | Duncan et al. ............ 169/47 |
| 3,981,232 A | * | 9/1976 | Williamson ............... 99/337 |
| 4,505,194 A | | 3/1985 | Bishop et al. |
| 4,854,949 A | * | 8/1989 | Giles et al. ............... 96/58 |
| 5,129,386 A | * | 7/1992 | Meister .................. 126/299 R |
| 5,154,161 A | * | 10/1992 | Rogers et al. .......... 126/299 D |

FOREIGN PATENT DOCUMENTS

| | | |
|---|---|---|
| GB | 2 146 889 | 5/1985 |
| WO | WO 2008/079925 | 7/2008 |

OTHER PUBLICATIONS

International Search Report from corresponding International Application, PCT/US2007/088280, dated Feb. 25, 2009 (4 pgs).
Written Opinion from corresponding International Application, PCT/US2007/088280 (5 pgs).

* cited by examiner

*Primary Examiner*—Darren W. Gorman
(74) *Attorney, Agent, or Firm*—Brinks Hofer Gilson & Lione

(57) ABSTRACT

A fire suppression system for a fryer is provided. The fire suppression system for the fryer may include a reservoir of fire suppression agent, piping connected to the reservoir, and one or more nozzles connected to the piping and configured to direct fire suppression agent into the fry vat when the lid is not in the fully open position (such as when the lid is in the closed/unlocked position). For example, when the lid is closed, a headspace may be created between the fry vat and an interior portion of the lid. When the lid is in the closed and unlocked position (creating an opening into the headspace for venting of the fry vat), the nozzle may be configured external to both the lid and the fry vat so that fire suppression agent is directed through the opening and into headspace of the fry vat.

21 Claims, 7 Drawing Sheets

FRYER FIRE SUPPRESSION SYSTEM

CROSS-REFERENCE TO RELATED APPLICATION

This application claims the benefit of U.S. Provisional Application No. 60/876,690, filed Dec. 22, 2006, the entirety of which is hereby incorporated by reference.

BACKGROUND

A pressure fryer is used to cook food (such as meat) in a vat using cooking oil. The food and cooking oil in the pressure fryer are brought to high temperatures while pressure is held high enough that the water within may be prevented from boiling off. This technique can leave the food very hot and juicy. The pressure fryer is typically used in industrial kitchens and can include a fire suppression system. Specifically, nozzles are positioned to direct fire suppression agent to the center of the vat when the lid of the pressure fryer is open. While this configuration reduces the possibility of fire in the pressure fryer, a better configuration is desired.

SUMMARY

The present embodiments relate to a fire suppression system for an appliance, such as a pressure fryer. The fryer may have a fry vat (in which the food and cooking oil are placed) and a lid for covering the fry vat. The lid of the fryer may have three positions, a fully open position, a closed/unlocked position (with lid being closed and the fry vat being vented through an opening) and a closed/locked position (with the fry vat sealed for cooking). The fire suppression system for the fryer includes a reservoir of fire suppression agent, piping connected to the reservoir, and one or more nozzles connected to the piping and configured to direct fire suppression agent into the fry vat when the lid is not in the fully open position (such as when the lid is in the closed/unlocked position).

For example, when the lid is closed, a headspace may be created between the fry vat and an interior portion of the lid. In one aspect of the invention, when the lid is in the closed and unlocked position (creating an opening into the headspace for venting of the fry vat), the nozzle may be configured external to both the lid and the fry vat so that fire suppression agent is directed through the opening and into headspace of the fry vat. The nozzle may be a flat spray (such as fan pattern) so more fire suppression agent may be inserted into the slot-shaped opening. As another example, the nozzle may be configured to insert fire suppression agent into another opening into the fry vat when the lid is in the closed/unlocked position. Specifically, the fry vat may include an opening to an overflow drain pipe that flows to an overflow drain. The nozzle may be configured such that fire suppression agent is inserted into the headspace of the fryer vat through the opening to the overflow drain pipe.

Moreover, the fire suppression system may include one or more nozzles connected to the piping and configured to direct fire suppression agent into the fry vat when the lid is in the fully open position. The one or more nozzles configured to direct fire suppression agent into the vat when the lid is in the fully open position may differ from the one or more nozzles configured to direct fire suppression agent into the fry vat when the lid is not in the fully open position in several respects, including: (1) position (such as position in the x-, y-, and/or z-direction); (2) type of nozzle (such as fan shaped versus cone shaped); and (3) aiming of nozzle (such as aiming upward or downward). In this way, the one or more nozzles configured to direct fire suppression agent into the fry vat when the lid is not in the fully open position to work either alone or in combination with the one or more nozzles configured to direct fire suppression agent into the vat when the lid is in the fully open position. In this way, the fire suppression system may better combat a fire in the pressure fryer.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE INVENTION

By way of overview, the preferred embodiments described below relate to a fire suppression system for a kitchen appliance, such as a fryer. The fire suppression system may be used in a variety of fryers, including pressure fryers. Two examples of pressure fryers are shown, including a mono rail center lid-lift fryer system (shown in FIGS. 1-3) and a dual lid-lift fryer system (shown in FIGS. 5-7). Specific examples of a fryer system that may be used in combination with the fryer fire suppression system include the Henny Penny Models 690, 691, 692 (mono rail center lid lift fryer system) and the Henny Penny Models 580, 581, 852, 590, 591, 592, 680, 681, 682 (dual lid lift fryer system). The listed models are for illustrative purposes only. Fryers from other manufacturers and other configurations may be used as well.

As discussed in more detail below, the fire suppression system may provide protection from fires with the lid in the fully open position (such as the fully open lid position) and/or in a closed position. For example, the lid in the fryer system may be in one of three positions including: (1) fully open position; (2) fully closed and locked; and (3) closed and vented. The fully open position may be when the loading rack and baskets of the fryer are in the fully open position. One example of an intermediate position (between the fully open position and the fully closed and locked position) may be when the lid is fully closed and the handle of the fryer is unlocked, creating an opening or a slot, thereby releasing the steam pressure from the headspace of the fryer vat. In this position, the safety latch may still be latched. As mentioned, a portion of the fryer may be open for venting of the fry vat. For example, the back portion of the fryer may be open, such as ¼ inch slot opening, to vent the vat of the fryer.

Typically, fire suppression systems are configured only to suppress fires when the lid of the fryer is in the fully open position. However, the fryer may be at risk to fires when the lid of the fryer is not in the fully open position. For example, when the lid of the fryer is partially open or configured to vent the vat of the fryer, the fryer may still be at risk of a fire (such as due to oil in the vat bubbling out of the opening or air entering the vat).

Figure 1:
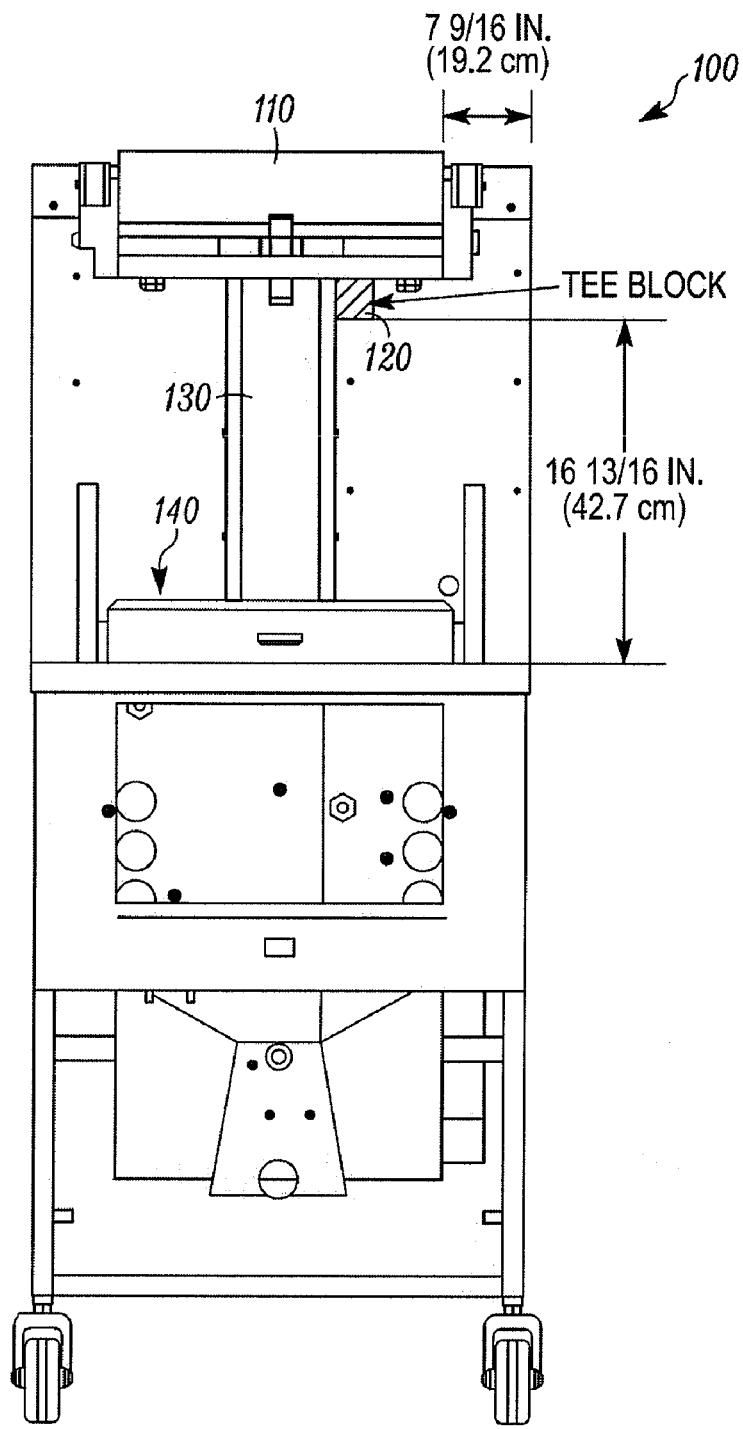
FIG. 1 is a front view of a mono rail center lid-lift pressure fryer with an example of a fire suppression system.
Figure 2:
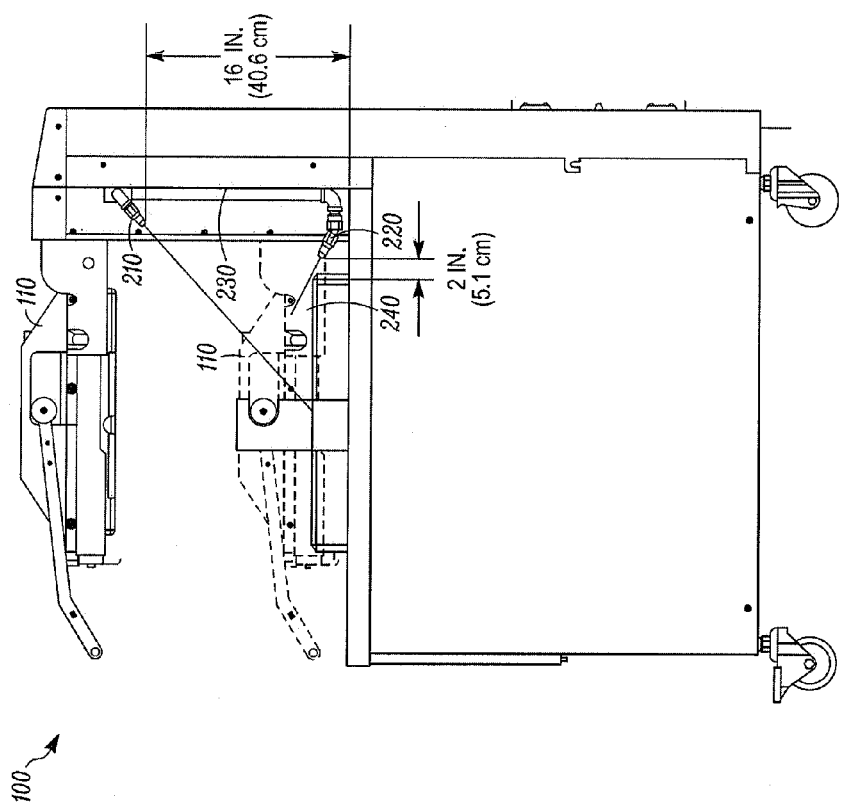
FIG. 2 is a side view of the mono rail center lid-lift pressure fryer depicted in FIG. 1.
Figure 3:
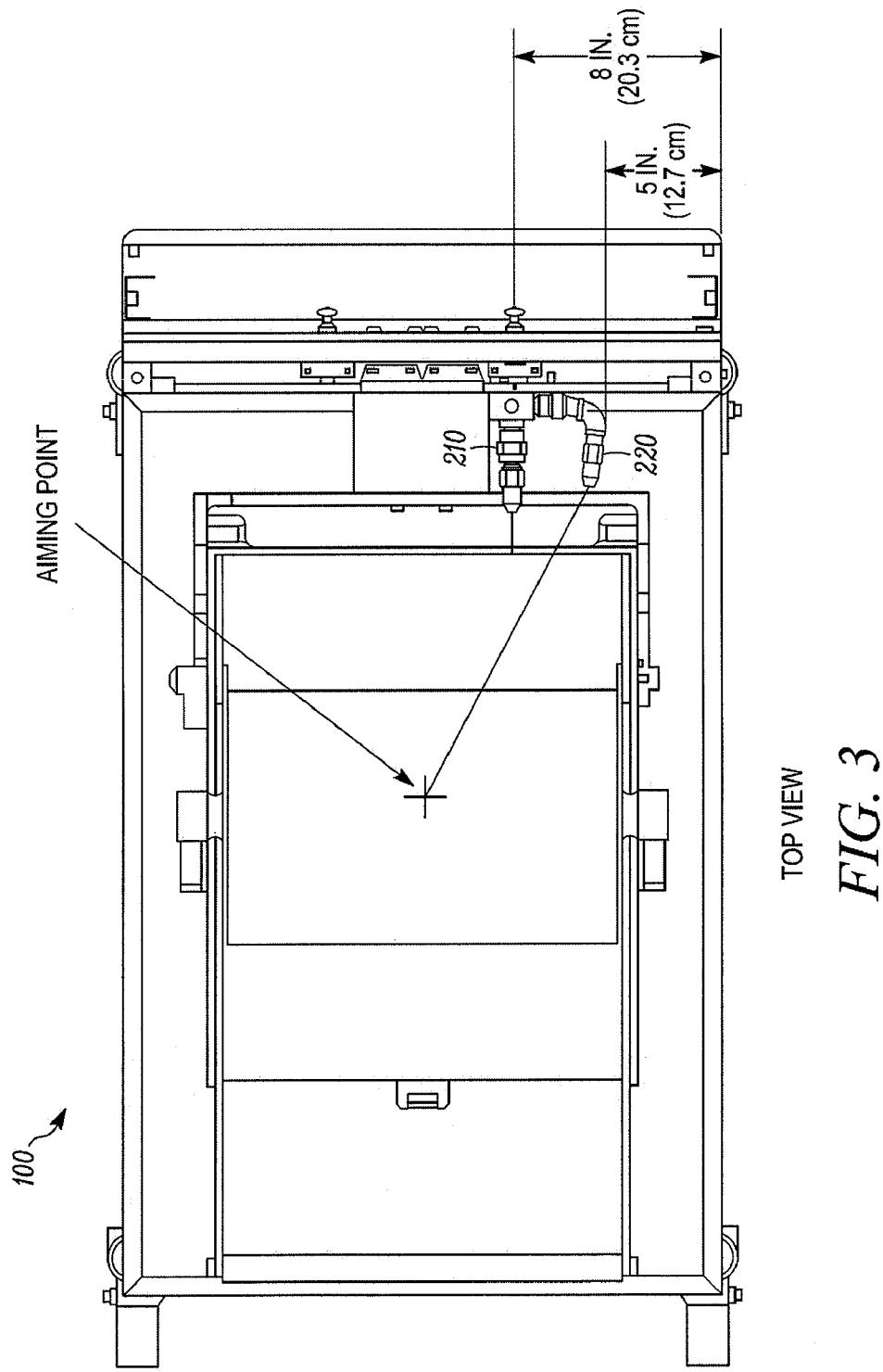
FIG. 3 is a top view of the mono rail center lid-lift pressure fryer depicted in FIG. 1.

FIG. 2 illustrates a side view of the fryer system depicted in FIG. 1, with the lid shown in the fully open position and in the venting position (in the venting position, the lid is show in dashed lines), rail 265, and cabinet 270. FIG. 3 depicts a top view of the fryer system depicted in FIG. 1.

Figure 4:
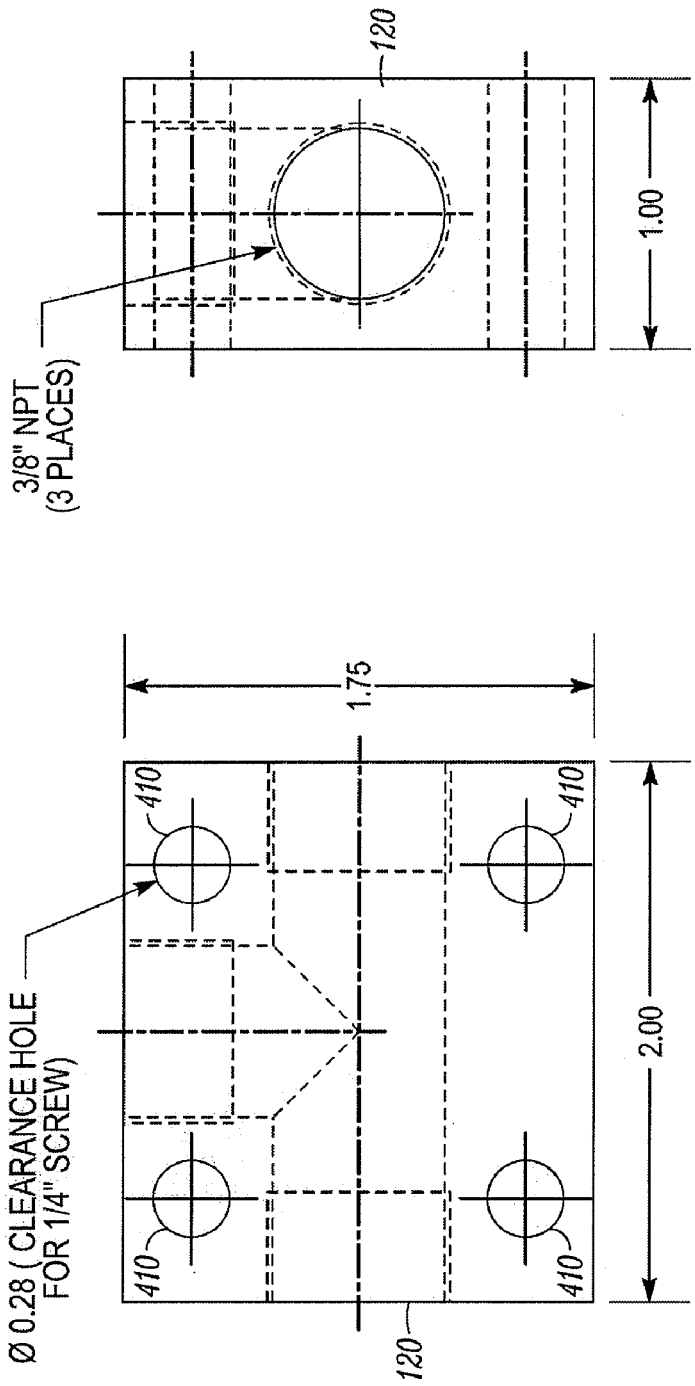
FIGS. 4a and 4b are a top view and an end view, respectively, of the Tee block depicted in FIG. 1.

FIG. 1 depicts a "Tee block" 120 which may be mounted to the fryer. For example, the Tee block 120 may be mounted to the fryer, such as a back portion of the fryer. The Tee block 120 is depicted in FIGS. 4a-b. Nozzles may be attached to the fryer using a nozzle assembly kit, which may comprise nozzles, nozzle swivel adaptors, nozzle caps, tee block with fasteners, close nipples, various stainless pipe lengths, and elbows. The nozzles may be configured in a variety of places in the Tee block in order to direct a fire suppression agent at different portions of the fryer. The fire suppression agent may be any substance that may be used to inhibit or reduce the effects of a fire.

FIGS. 2 and 3 illustrate two nozzles 210, 220 used in the fire suppression system. The two nozzles 210, 220 depicted in FIGS. 2 and 3 are for illustrative purposes and fewer or greater number of nozzles may be used, as discussed in more detail below. At least two of the nozzles in the system may differ from one another in several ways including: position (such as position in the x-, y-, and/or z-direction); type of nozzle; and aiming of nozzle (such as aiming upward or downward). As shown in FIG. 2, the two nozzles 210, 220 are in different positions (different in the z-direction) and have opposite aiming of the agent from the nozzles (upward versus downward). Specifically, the 1N Nozzle 210, from the Tee Block, Part No. 434424, may be configured so that nozzle tip is located 16 in. (40.6 cm) up from base of fryer surface and 5 in. (12.7 cm) in from right side of appliance back shroud. The 1N Nozzle 210 may be aimed downward (and to one side, such as at an approximately 45° downward (shown in FIG. 2) and a 45° inward (shown in FIG. 3)), to discharge at a center point of the fry vat. As another example, the 1F Nozzle 220, running down from the Tee Block to the base of the fryer, may have its nozzle tip located 2 in. (5.1 cm) from the back side of the fry vat, and 8 in. (20.3 cm) in from the right side of the appliance back shroud. The 1F nozzle 220 may be aimed upward, as shown in FIG. 2. In this manner, when the lid 110 of the fryer is partially closed, such as when the fryer vat 140 is venting through the opening 240 of the back portion, the fire suppression agent may be directed through the opening 240 of the back portion that is non-closed and under the cover of the lid 110. In this way, the fire suppression agent may be inserted into the headspace of the fryer vat 140. Though the opening 240 is shown in FIG. 2 at the back portion, the opening 240 may be along one or more sides of the vat Further, the first nozzle 210 and second nozzle 220 may be of different types. For example, the first nozzle 210 may be a narrow pattern nozzle (such as cone shaped), for instance 1N, Part No. 419335. The second nozzle 220 may be a flat spray (such as fan pattern), for instance 1F, Part No. 419333. As discussed above, the 1F nozzle 220 may be a flat spray nozzle and the spray may be horizontal to that of the edge of the back lip of the fry vat.

Each fryer may include a reservoir 250 having a minimum of 3.0 Gallons of ANSULEX™ Low pH fire suppression agent. Piping may be used to connect the reservoir discharging through the two one-flow nozzles (1N and 1F). An example of the piping is shown at element 230. The two nozzles 210, 220 may be operated simultaneously, such as emitting fire suppression agent at the same time.

FIGS. 4a and 4b depict a top view and an end view (respectively) of a portion of the Tee block 120. The Tee block may be attached to the fryer via holes 410 for using screws, shown in FIG. 4a. Additional holes may be used for inlets (to input the fire suppression agent via tubing 260 into the Tee block 120), and for outlets for the nozzles. Piping may also be included in the Tee block 120, shown by the dashed lines in FIGS. 4a and 4b. For example, FIG. 4b illustrates a connection to ⅜" national pipe thread (NPT) tubing.

Figure 5:
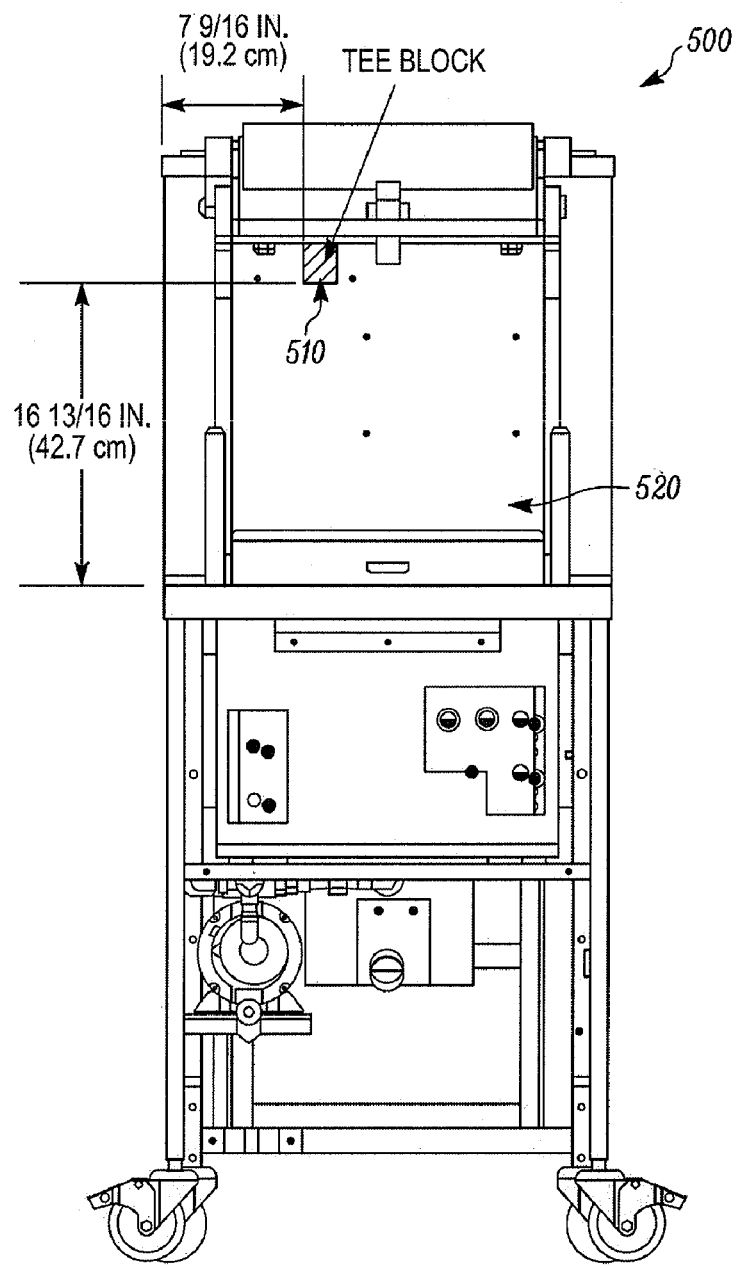
FIG. 5 is a front view of a dual lid-lift pressure fryer with an example of a fire suppression system.
Figure 6:
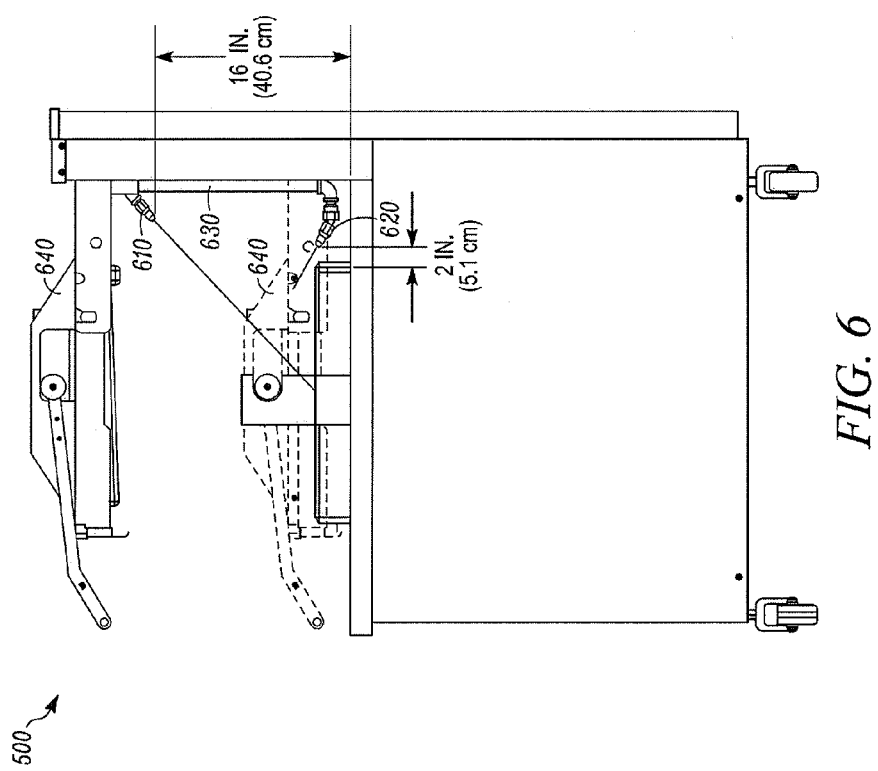
FIG. 6 is a side view of the dual lid-lift pressure fryer depicted in FIG. 5.
Figure 7:
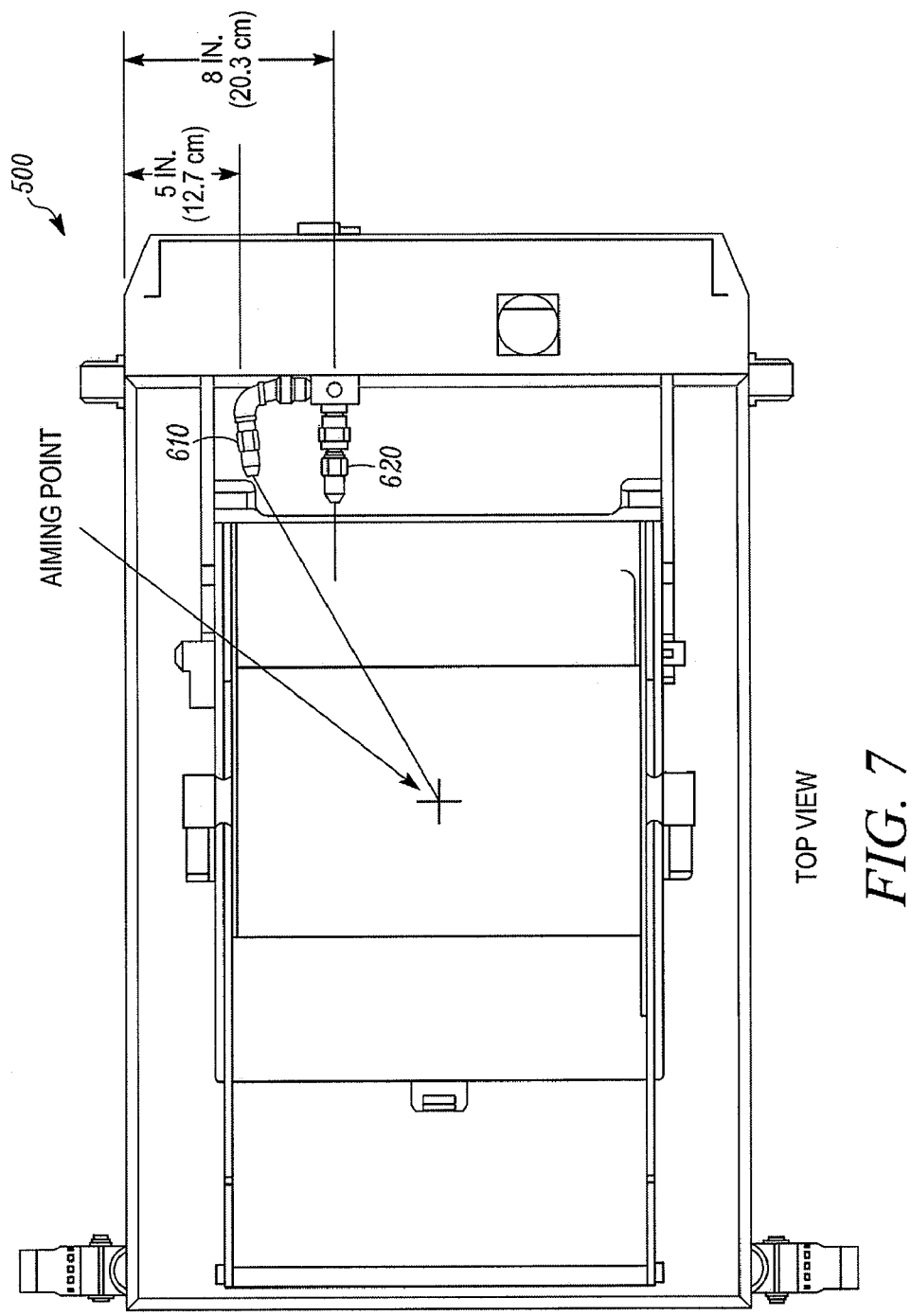
FIG. 7 is a top view of the dual lid-lift pressure fryer depicted in FIG. 5.

FIG. 5 illustrates a front view of a dual lid lift fryer system, with the lid in the open position. The combination of the fryer and fryer fire suppression system is depicted as element 500 with Tee Block 510 and fryer vat 520. FIG. 6 illustrates a side view of the fryer system depicted in FIG. 5, with the lid 640 shown in the fully open position and the venting position. FIG. 7 depicts a top view of the fryer system depicted in FIG. 5.

Similar to nozzle 210, the first nozzle 610 in FIGS. 6 and 7 may be a narrow pattern nozzle (such as cone shaped) positioned in an upper position, for instance 1N, Part No. 419335. Similar to nozzle 220, the second nozzle 620 may be a flat spray (such as fan pattern) positioned in a lower position, for instance 1F, Part No. 419333. As depicted in FIG. 6, the nozzles 610, 620 may be positioned on the fryer in different locations.

For example, the 1N Nozzle 610 in the upper position, from the Tee Block 510, Part No. 434424, may be configured so that nozzle tip is located 16 in. (40.6 cm) up from base of fryer surface and 5 in. (12.7 cm) in from left side of appliance back shroud (as opposed to the right side as shown in FIG. 3). The 1N Nozzle 610 may be aimed downward to discharge at a center point of fry vat. As another example, the 1F Nozzle 620 in the lower position, running down from the Tee Block 510 via piping 630 to the base of the fryer, may have its nozzle tip located 2 in. (5.1 cm) from back side of fry vat, and 8 in. (20.3 cm) in from the left side of appliance back shroud (as opposed to the right side as shown in FIG. 3). As discussed above, the 1F nozzle 620 may be a flat spray nozzle and the spray may be horizontal to that of the edge of the back lip of the fry vat. The 1F nozzle 620 may be aimed upward, as shown in FIG. 6.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A fryer fire suppression system for a fryer having a fry vat and at least one lid, the lid closes on the fry vat to create a headspace between an underside of the lid and the fry vat, the headspace having a closable opening when the lid is closed to vent the fryer, the fryer fire suppression system comprising:
   a reservoir of fire suppression agent;
   piping connected to the reservoir; and
   at least one nozzle connected to the piping and positioned external to the lid and the fry vat, the at least one nozzle directing the fire suppression agent from outside of the vat into the vat through the closable opening into the headspace of the fry vat to counteract a fire when the lid of the fryer is closed.

2. The fryer fire suppression system of claim 1, wherein the at least one nozzle directs fire suppression agent in an upward direction.

3. The fryer fire suppression system of claim 2, wherein a spray pattern for the at least one nozzle is fan shaped.

4. The fryer fire suppression system of claim 1, wherein the fryer comprises a pressure fryer.

5. The fryer fire suppression system of claim 1, wherein the at least one nozzle is positioned below at least a part of the lid when the lid is closed.

6. The fryer fire suppression system of claim 1, wherein the opening is at a back portion of the vat; and wherein the at least one nozzle directs fire suppression agent upward at an angle less than 90° relative to a horizontal plane.

7. A fryer fire suppression system for a fryer having a fry vat and at least one lid, the fire suppression system comprising:

a reservoir of fire suppression agent;

piping connected to the reservoir;

a first nozzle connected to the piping and positioned to direct the fire suppression agent into the fry vat to counteract a fire when the lid of the fryer is in a fully open position; and a second nozzle connected to the piping and positioned external to the lid and the fry vat to direct the fire suppression agent into the fry vat to counteract a fire when the lid of the fryer is in a closed position.

8. The fryer fire suppression system of claim 7, wherein the lid is closes on the fry vat to create a headspace between an underside of the lid and the fry vat, the headspace having an opening when the lid is closed to vent the fryer; and wherein the second nozzle directs the fire suppression agent through the opening into the headspace.

9. The fryer fire suppression system of claim 8, wherein the second nozzle directs the fire suppression agent to counteract a fire when the fryer vat is vented forming the opening.

10. The fryer fire suppression system of claim 7, wherein the first nozzle and second nozzle are directed in opposite directions.

11. The fryer fire suppression system of claim 10, wherein the first nozzle is directed in a downward direction toward the vat; and wherein the second nozzle is directed in an upward direction toward the underside of the lid of the fryer.

12. The fryer fire suppression system of claim 11, wherein a spray pattern for the first nozzle is different from the spray pattern for the second nozzle.

13. The fryer fire suppression system of claim 12, wherein the spray pattern for the first nozzle is cone shaped; and wherein the spray pattern for the second nozzle is fan shaped.

14. The fryer fire suppression system of claim 7, wherein the first nozzle is positioned on an upper portion of the fryer and the second nozzle is positioned on a lower portion of the fryer.

15. The fryer fire suppression system of claim 7, further comprising a block, with the first and second nozzles being connected to the block.

16. The fryer fire suppression system of claim 15, further comprising tubing connected to the block for inputting the fire suppression agent to the block.

17. The fryer fire suppression system of claim 1, wherein the fryer is at least partly housed in a cabinet; and wherein the at least one nozzle is positioned external to the cabinet that at least partly houses the fryer.

18. A fryer fire suppression system for a fryer having a fry vat and at least one lid, the lid closes on the fry vat to create a headspace between an underside of the lid and the fry vat, the headspace having an opening when the lid is closed to vent the fryer, the fryer fire suppression system comprising:

a reservoir of fire suppression agent;

piping connected to the reservoir; and at least one nozzle connected to the piping and positioned external to the lid and the fry vat, the at least one nozzle directing the fire suppression agent through the opening into the headspace of the fry vat to counteract a fire when the lid of the fryer is closed, wherein the fryer is at least partly housed in a cabinet;

wherein the at least one nozzle is positioned external to the cabinet that at least partly houses the fryer;

wherein the lid of the fryer moves along at least one rail; and wherein the at least one nozzle is connected to the rail.

19. The fryer fire suppression system of claim 7, wherein the fryer is at least partly housed in a cabinet; and wherein the first nozzle and second nozzle are positioned external to the cabinet that at least partly houses the fryer.

20. The fryer fire suppression system of claim 19, wherein the lid of the fryer moves along at least one rail; and wherein the first nozzle and the second nozzle are connected to the at least one rail.

21. A fryer system comprising:

a fry vat;

at least one lid, the lid of the fry vat including a closed position to create a headspace between an underside of the lid and the fry vat, the headspace having a closable opening when the lid is closed to vent the fry vat;

a reservoir of fire suppression agent;

piping connected to the reservoir; and at least one nozzle connected to the piping and positioned external to the at least one lid and the fry vat, the at least one nozzle directing the fire suppression agent from outside of the fry vat into the fry vat through the closable opening into the headspace of the fry vat to counteract a fire when the lid of the fry vat is closed.

\* \* \* \* \*